(12) United States Patent　　(10) Patent No.:　　US 7,194,146 B2
BenDaniel et al.　　(45) Date of Patent:　　Mar. 20, 2007

(54) AUTOMATED SYSTEM AND METHOD FOR PROCESSING OF ASTRONOMICAL IMAGES

(75) Inventors: Matt BenDaniel, Medford, MA (US); Michael Paolucci, Washington, CT (US)

(73) Assignee: Slooh, LLC, Washington, CT (US)

( * ) Notice: Subject to any disclaimer, the term of this patent is extended or adjusted under 35 U.S.C. 154(b) by 141 days.

(21) Appl. No.: 11/019,404

(22) Filed: Dec. 22, 2004

(65) Prior Publication Data

US 2006/0132608 A1　　Jun. 22, 2006

(51) Int. Cl.
　　*G06K 9/36*　　(2006.01)
　　*H04N 5/225*　　(2006.01)
　　*G03G 15/14*　　(2006.01)
(52) U.S. Cl. .................... 382/284; 348/207.1; 359/399
(58) Field of Classification Search ................ 382/103, 382/284, 312; 348/207.1, 345, 350, 221.1, 348/291, 143–147; 359/399, 725
See application file for complete search history.

(56) References Cited

U.S. PATENT DOCUMENTS

| | | | |
|---|---|---|---|
| 4,682,091 A | * | 7/1987 | Krewalk et al. ............ 318/685 |
| 5,365,269 A | | 11/1994 | Holmes et al. |
| 6,023,291 A | | 2/2000 | Kamel et al. |
| 6,563,636 B1 | * | 5/2003 | Baun et al. .................. 359/429 |
| 7,068,180 B2 | * | 6/2006 | Lemp, III ................ 340/815.4 |
| 2004/0233521 A1 | * | 11/2004 | McWilliams ................ 359/399 |
| 2005/0053309 A1 | * | 3/2005 | Szczuka et al. ............. 382/284 |

* cited by examiner

*Primary Examiner*—Kanjibhai Patel
(74) *Attorney, Agent, or Firm*—John M. Johnson; Carter Ledyard & Milburn LLP

(57) ABSTRACT

This invention encompasses near-real-time processing of astronomical images for viewing on a computer. This image processing method is preferably integrated with the control of an astronomical observatory. The subject invention thus includes an Internet-based system that provides a virtual experience of an astronomical observatory. The subject invention preferably uses an unmanned astronomical observatory to observe galaxies, nebulae, stars, etc. The observatory produces color images suitable for viewing on a computer monitor. These images are delivered to users across the Internet using web browser-based software.

10 Claims, 8 Drawing Sheets

AUTOMATED SYSTEM AND METHOD FOR PROCESSING OF ASTRONOMICAL IMAGES

SUMMARY OF THE INVENTION

This invention encompasses near-real-time processing of astronomical images for viewing on a computer. This image processing method is preferably integrated with the control of an astronomical observatory. The subject invention thus includes an Internet-based system that provides a virtual experience of an astronomical observatory. The subject invention preferably uses an unmanned astronomical observatory to observe galaxies, nebulae, stars, etc. The observatory produces color images suitable for viewing on a computer monitor. These images are delivered to users across the Internet using web browser-based software.

The images produced by the subject invention can be contrasted to views a skilled observer could obtain visually through a large (10-inch aperture) telescope in dark clear skies. Due to limitations of the human eye and of optics, visual observation virtually never shows color in deep sky objects. A Charge Coupled Device (CCD) camera is more sensitive than the human eye, and the subject invention shows saturated true colors. The faint nature of these objects prevents even skilled visual observers from seeing the level of detail that the subject invention produces with less than 5 minutes of integration. Novices often erroneously expect to see using a telescope what, instead, the subject invention yields.

The observation of a celestial object in accordance with the present invention is called a mission. Each mission typically has a duration of about 10 minutes. A server computer remote from the observatory manages a schedule of missions each night. At each of the appropriate times, that server sends a mission command to observatory, using a custom Remote Observatory Message Protocol (ROMP). Custom computer software (ObservatoryDriver) at the observatory receives each command and directs the movements and operation of the observatory equipment in order to aim at the celestial object and gather a series of CCD exposures. The software gathers the raw exposures, which are not initially suitable for end-user viewing, and ultimately processes them into viewable color images.

The observatory also continually emits a sequence of event messages to the server computer that describe all of the individual actions occurring. This allows the server—and users—to monitor the activity during the missions. The images, the events, and audio streaming from the observatory can be presented to users as an integrated virtual observatory experience.

The automated image processing system of the subject invention was designed to run on personal computers at an observatory. The automated image processing system can thereby easily control the equipment, access the raw data, and produce compact images that are transmitted from the observatory.

In order for the above to be accomplished, the automated image processing system must filter out extraneous artifacts, combine raw images for noise reduction and color rendering, and adjust the contrast. Although it requires multiple minutes to gather enough exposures to produce good quality, the software of the subject invention issues its first image within seconds after the start of the mission. The initial image is monochrome and noisy. During the succeeding minutes, as more exposures are gathered, the quality of the image is improved, and color is added. The series of images in each mission can be presented to users to show the progressive development toward the final image of the mission.

BRIEF DESCRIPTION OF THE DRAWINGS

These and other subjects, features and advantages of the present invention will become more apparent in light of the following detailed description of a best mode embodiment thereof, as illustrated in the accompanying Drawings.

DETAILED DESCRIPTION OF THE PREFERRED EMBODIMENTS

1. The Observatory Hardware

Figure 1:
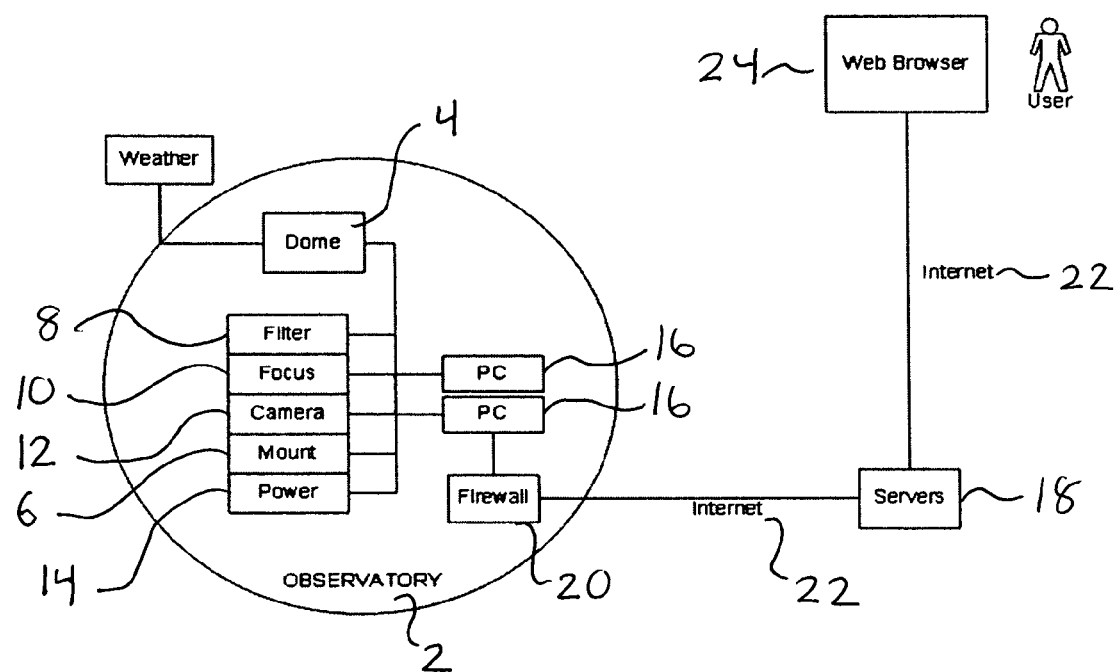
FIG. 1 is a block design of the overall hardware architecture of the subject invention.

First referring to FIG. 1, each observatory 2 is housed within a dome 4. The dome 4 has motors known in the art that allow it to be opened and rotated. The observatory 2 contains a robotic equatorial telescope mount 6, the motion of which is controlled by software known in the art. On the mount 6 is a large telescope optical tube assembly (OTA). At the back end of the OTA is an imaging train. The imaging train consists of a filter wheel 8, a focuser 10, a Charge Coupled Device (CCD) camera 12 and a power source 14. Each CCD camera is a specialized instrument for astro-imaging that cools its chip and is designed in additional ways to reduce overall noise. The filter wheel 8 typically has the following selectively accessible filters: red, green, blue, clear and dark (neutral density or H-alpha).

Each large OTA has a smaller OTA piggybacked on top, with its own imaging train. The dual OTA systems provide both high and low magnification views of the target. All of the above equipment has associated control electronics and requires power supply wires and control cables routed down the mount to the observatory computers 16 well known in the art. The observatory 2 includes computers that can be, for example, Windows operating system based personal computers using Pentium 4 Intel cpu processors.

At the site, one stationary weatherproof all-sky camera is mounted outside the observatories 2. The observatory 2 has weather sensing equipment, video/webcams, and microphones, as well as software programmatically actuatable power circuits, all known in the art.

Multiple observatories 2 can be situated at the same site, or around the world, all connected by computers to servers 18 having a firewall 20 there between via the Internet 22 to be accessed by users' web browsers 24 by computers 16.

Each observatory should be located at a dark site with generally good weather and requires a power source and an internet connection.

2. Focusing

Accurate focus is very important for high image quality. There exists off-the-shelf CCD focusing software, but it generally takes a few minutes to achieve focus. In contrast the subject invention achieves focus in approximately one second. This requires that the image train have repeatable focus. In other words, at different times, under similar conditions, the optimal focuser position setting will be the same. The calibration of the focuser must be consistent, even after it is powered down and back up.

The main consideration for optimal focus is OTA temperature, which is usually similar to ambient temperature. The OTA tube walls lengthen and shorten with changing temperature. The imaging train (usually the focuser) has an OTA temperature sensor, known in the art. Over a range of temperatures, careful sampling of best focus position yields data points (position versus temperature). These can be plotted and a curve can be fitted. A linear curve is usually adequate. Its slope indicates much the focus position changes with temperature.

An additional factor is the filter selected. Because the OTA may not be truly apochromatic, each waveband will have a slightly different focal point. In the subject invention, after the instantaneous OTA tube wall temperature is ascertained by the temperaturetemperate sensor, the proper focus position is determined using the following calculation:

newPosition=offset[filter]+slope*(temperature−nominalTemperature);

The optimal focus positions are determined empirically (at the nominal temperature) for each filter and are held in the offset table.

A software based electronic signal is then sent to the focuser, telling it to adjust its position. The entire sequence takes about one second. This focusing is performed at the start of each mission and each time there is a filter change.

Commercially available focusers usually include simple application software with graphical interfaces for human interaction with the focusers. Instead, the subject invention uses Java to operate serial protocols for the focuser hardware.

3. Image Processing

The operation of the cameras and the CCD control manipulation of the images can be performed by the subject invention by Java-based software programs that interface with off-the-shelf CCD camera control software. CCD control software often has an automation interface (COM), and its operation can be driven by custom Java-based software of the subject invention. Hence, the subject invention uses a facility (Intrinsyc J-Integra) that enables Java to control the COM interface of the off-the-shelf CCD software (Diffraction Limited MaxIm DL). The off-the-shelf CCD software thus performs most of the individual camera control and image processing steps, but it is controlled in a unique way by subject invention which controls and accesses the CCD control software in modules called CameraDriver and ImageDriver.

The combination of control actions of the astronomical hardware and the processing of the images together is called a "recipe." Different recipes are used for different celestial objects. There are four basic types of recipes: lunar, planet, deep sky, and all-sky. Each step of image processing improves the image. Parameters of each recipe are held in hardcoded recipe instances. The parameters include the binning, subframe dimensions, target image size, exposure duration, and whether or not to use color. Variations of the parameters exist for the different objects and cameras used. An example of a Java-based recipe program of the subject invention follows:

```
package tt.observatory;
import java.util.Map;
import java.util.HashMap;
class Recipe {
private static Map extent = new HashMap( );
 protected final static Recipe getRecipe(String name) {
    name = name.toLowerCase( );
    Recipe result = (Recipe)extent.get(name);
    if (result==null)
      result = Recipe.DEEPSKY;
    return result;
 }
 boolean isPlanet( ) {
   return tt.mission.Formula.isPlanet(name);
 }
 static final short w = 640; //pixels
 static final short h = 480; //pixels
 static final short fullFrame = −1;
 static final boolean HALPHA = true;
 static final boolean TRICOLOR = false;
 // ST-2000XM minimum exposure is 0.01 sec
 // ST-10XME minimum exposure is 0.11 sec
 // ST-8XE minimum exposures is 0.11 sec
 // ST-237 minmum exposure is 0.01 sec
   static final Recipe SUN = new Recipe("Sun",2,fullFrame,fullFrame,1, HALPHA); //
Solar Filter
   static final Recipe SUNWIDE = new Recipe("SunWide",1 ,fullFrame,fullFrame,0.001,
HALPHA); // Solar Filter
   static final Recipe MOON = new Recipe("Moon", 1, fullFrame, fullFrame, 0.01,
HALPHA); // will this saturate at full?
   static final Recipe MOONWIDE = new Recipe("MoonWide", 2, fullFrame, fullFrame,
0.01, HALPHA); // will saturate at full?
```

-continued

```
static      final      Recipe      LUNARECLIPSE      =      new
Recipe("LunarEclipse",2,fullFrame,fullFrame,1,TRICOLOR);
  static final Recipe MOONWIDE5D = new Recipe("MoonWide5D", 1, w, h, 0.001,
HALPHA);
  static final Recipe LUNARECLIPSE5D = new Recipe("LunarEclipse5D", 1, w, h, 1,
TRICOLOR);
  static final Recipe PLANETFINDER = new Recipe("PlanetFinder", 3, fullFrame,
fullFrame, 0.1, TRICOLOR);
  static final Recipe PLANETWIDE = new Recipe("PlanetWide", 1, w, h, 0.3,
TRICOLOR);
  static final Recipe URANUS = new Recipe("Uranus", 1, w, h, 10.0, TRICOLOR);
  static final Recipe SATURN = new Recipe("Saturn", 1, w, h, 0.30, TRICOLOR);
  static final Recipe JUPITER = new Recipe("Jupiter", 1, w, h, 0.05, TRICOLOR);
  static final Recipe MARS = new Recipe("Mars", 1, w, h, 0.10, HALPHA);
  static final Recipe VENUS = new Recipe("Venus", 1, w, h, 0.01, HALPHA);
  static final Recipe MERCURY = new Recipe("Mercury", 1, w, h, 0.10, HALPHA);
  static final Recipe MAG3STAR = new Recipe("Mag3Star",1,w, h, 0.30, TRICOLOR);
  static final Recipe DEEPSKY = new Recipe("DeepSky", 3, fullFrame, fullFrame, 30,
TRICOLOR);
  static final Recipe DEEPSKY2 = new Recipe("DeepSky2", 2, fullFrame, fullFrame,
30, TRICOLOR); // ST-8
  static final Recipe EXTENDED = new Recipe("Extended", 3, fullFrame, fullFrame,
60, TRICOLOR);
  static final Recipe EXTENDED2 = new Recipe("Extended2", 2, fullFrame, fullFrame,
60, TRICOLOR); // ST-8
  static final Recipe BIAS = new Recipe("Bias", 1, fullFrame, fullFrame, 0.001, false);
  static final Recipe DARK = new Recipe("Dark", 1, fullFrame, fullFrame, 30, false);
  static final Recipe FLAT = new Recipe("Flat", 1, fullFrame, fullFrame, 0.01, false);
  Recipe(String name, int binning, short width, short height, double duration, boolean
halpha)
  {
    extent.put(name.toLowerCase( ), this);
    this.name = name;
    this.binning = (short)binning;
    this.width = width;
    this.height = height;
    this.duration = (float)duration;
    this.halpha = halpha;
  }
  static Recipe dup(String name, Recipe original) {
    extent.put(name.toLowerCase( ), original);
    return original;
  }
}
```

A. General Image Processing Flow

The following is the general image processing logic sequence of the subject invention:

1. When the camera has completed the exposure, the raw image is downloaded from the camera.
2. The image may be calibrated by subtracting a scaled dark frame and dividing by a flat frame.
3. The image is rotated to orient it north up.
4. The image is processed.
5. A copyright mark is added, by superimposing a static copyright image that was produced in a standard image editing software tool.
6. An event is sent describing the image that was just produced.
7. A second event is sent with the processed image data.

The processing for all types of images includes filtering out hot and dead pixels. If the source image is larger than the target image size (e.g. 640×480), the image is downscaled. Every type of image processing does some sort of contrast adjustment (AKA stretching). Most types of stretching require two parameters: low value and high value. Acceptable stretch parameters are determined empirically for each object or object type.

The subject invention can accept images in a variety of formats and can store its processed images in a variety of formats. It is often straightforward to convert among different formats, although one sometimes needs to consider the issue of information loss.

A typical input format employed by the subject invention is Flexible Image Transport System (FITS), a standard file format used in astronomical applications, endorsed by NASA and the International Astronomers Union. FITS is a bulky but lossless storage format. FITS also includes extensive support for header information to describe the image and the equipment and procedures used to produce it. A color 640×480 file in FITS typically requires 4 MB of space.

The typical output image format employed by the subject invention is Joint Photographic Experts Group (JPEG), a near-universal ISO standard format that offers adjustable compression. JPEG enables a typical 640×480 color celestial image to be stored in a file about the size of only 50 kilobytes, with a JPEG quality level of 90%. Such a file transmits quickly over the dial-up modem connections that many users have, or over an observatory's limited bandwidth. JPEG's compression benefit comes at the cost that some (unimportant) information is lost.

B. Lunar Image Processing

During the moon mission, monochrome images are iteratively produced. The moon is bright and generally colorless. Through standard RGB filters, even with the shortest possible exposure duration, the moon generally saturates the detector. However it can be imaged in monochrome through a high-density filter (e.g. narrowband H-alpha).

During each Moon mission, the subject invention: gathers a short exposure, sharpens the image, and adjusts the contrast using a gamma stretch. That monochrome image is ready to be delivered.

The exposure can be longer when the Moon has waned.

C. Solar Imaging

The recipe for Sun images is very similar to that for Moon images. The telescopes must be outfitted with solar filters, either full spectrum or narrowband H-alpha.

The contrast adjustment is performed by a linear stretch. A different stretch high-parameter is used for processing solar images at the edge of the solar disk than in the middle. The software detects whether the image is at the edge by examining the 10-percentile brightness level. If the brightness is over a threshold, then it is in the middle of the disc. Finally, the subject invention artificially tints the monochrome image a yellow-orange color.

D. Lunar Eclipse Processing

Lunar eclipses are darker than a full moon and can be recorded using color filters. A lunar eclipse also merits color imaging, because it displays golden and red hues. Exposures through red, green and blue filters are combined to yield color. The image is sharpened, color-smoothed, stretched, and delivered.

A form of Automatic Gain Control (AGCAGC) is used during lunar eclipses. A full moon is very bright. Once the Moon enters the umbra, over a few hours, it gets progressively darker until eclipse midpoint. Then it brightens back to full brightness. This means that no single exposure duration uniformly yields an optimal exposure. The subject invention identifies the image's maximum brightness value and adjusts the subsequent exposure duration accordingly. The formula (in Java) is:

duration*=10000.0/maxValue;

The calculated duration is carried over to the next lunar eclipse mission during an event. If the calculated duration becomes less than the minimum supported by the camera—as happens when the Moon emerges from the umbra—standard lunar image processing must be applied.

E. Planet Image Processing

Because planets are very small in appearance, planet imaging is performed only with a high magnification system. Exposure durations only a few seconds or fraction of a second are required. At the beginning of each mission, in order to produce the first image as quickly as possible, a monochrome image is produced using an image taken through a red filter. The image is sharpened and linearly stretched. The monochrome image is delivered. Then green and blue exposures are made. The three color exposures are then aligned (i.e. registered) and combined into a color image. Calibrated channel weightings must be used for the color channels in order to yield correct color. For the remainder of the mission, color images are produced.

One special operation is performed prior to planet imaging, if the pointing accuracy of the high magnification system is insufficient. A quick exposure can be made using the entire CCD area. The planet can be assumed to be the brightest object in the field of view. If the planet is off center, the software can slew the mount to center it. This allows the planet recipe to use the highest magnification (unbinned) and central region of the chip. This ensures that the planet will be in the center of view, optically on-axis for minimal aberrations.

F. Deep Sky Image Processing

Deep sky objects (galaxies, nebulae, star clusters, comets) are faint. Other "undesirable" sources of photons compete with the desirable signal from the target and make it difficult to isolate. These undesirable sources (i.e. noise) include natural background nighttime skylight, man made light pollution, and moonlight. The CCD camera chip, itself, introduces its own internal noise due to thermal radiation and readout. Longer exposures are required in order to gather enough signal and reduce the noise content. Deep sky image processing must strive to amplify the signal to make the image brighter, while trying not to over-emphasize the noise. The longer the exposures are performed, the higher the signal to noise ratio. While the quality gains after 10 minutes of accumulated exposure have steeply diminishing returns, integrations of up to 30 minutes have been performed.

Figure 8:
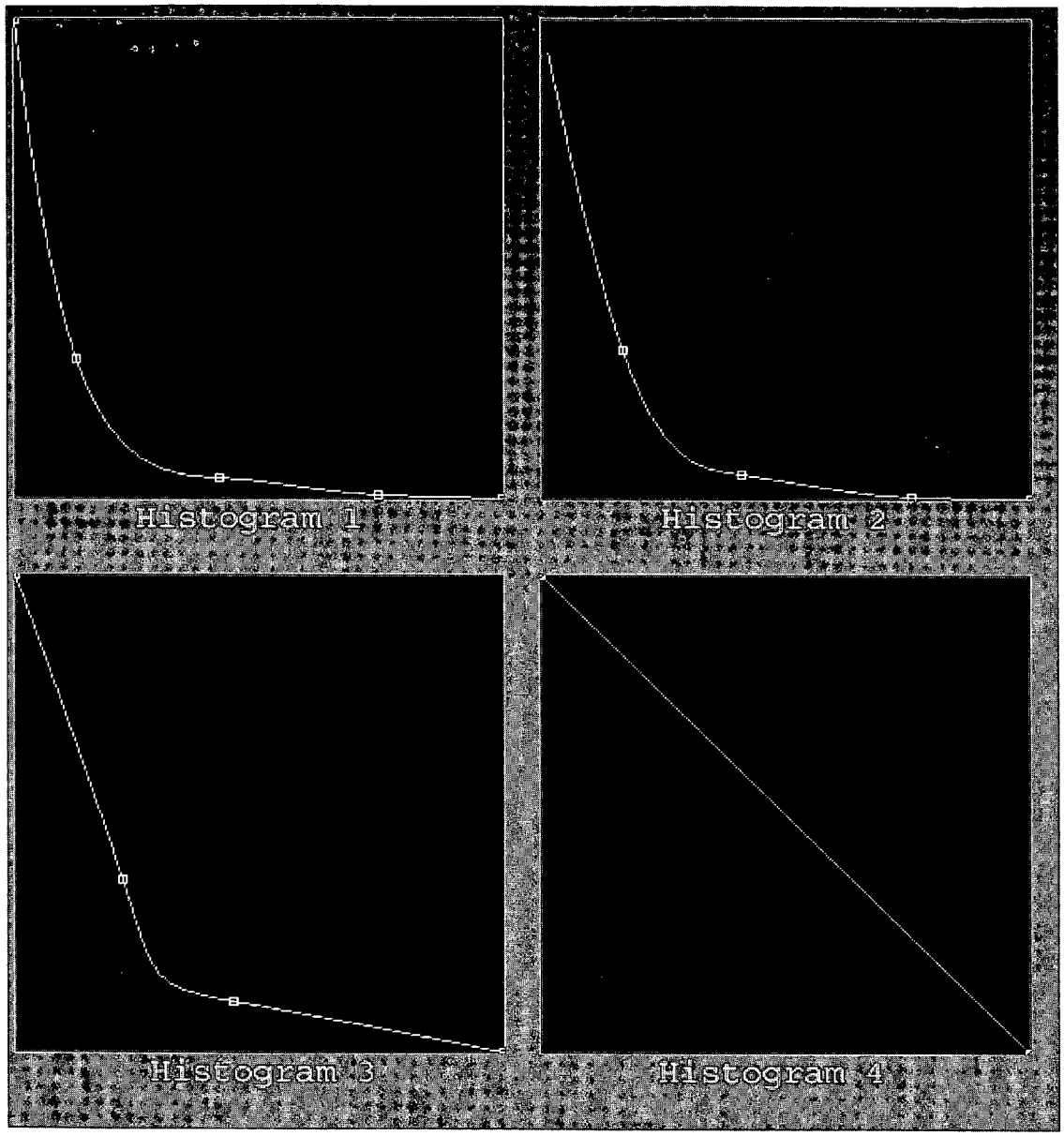
FIG. 8 is a set of graphical representations showing the derivation of the processing histogram of the subject invention.

At the start of the mission, in order to deliver an image as quickly as possible, a 3-second exposure is made through the red filter. All deep sky images are calibrated using dark and flat frames. Hot and dead pixels are filtered out. If the camera is a non-antiblooming (NABG) camera, any blooming is filtered out. The image is then stretched according to a histogram, which tends to make most of the image a dark gray with small amount of bright values. The histogram was derived empirically and manually (see FIG. 8). The characteristics of the resulting image are very sensitive to the shape of the histogram. This helps nebulosity be visible and softens the stars. The 3-second monochrome image is delivered.

The next image is a monochrome 10-second image. It is processed similarly to the 3-second image. Because the exposure is longer, the image quality is higher.

Next a series of three color channel images is exposed: red, green and blue. For a 5-minute mission, the duration is 30-seconds each. For a 10-minute mission, the duration is 60-seconds each. The first exposure (red) is delivered as a monochrome image, and processed the same as the 3-second and 10-second images above. Again, because its duration is longer than the preceding 10-second image, its quality is better still.

After the green and blue exposures are completed, the subject invention builds its first color image of the mission. When using high magnification, each image is registered to the red channel image. The RGB channels are combined into a single color image. The weightings used for the three channels are hardcoded as ratios for the particular filter set of the camera. The ratios can be adjusted based on the altitude of the object, because the atmosphere will transmit the wavebands at rates that depend on altitude.

The aforementioned registration process works primarily by shifting the view within each frame. When the RGB channels are combined, the edges of the resulting combined image have missing information and need to be trimmed. A 6-pixel wide swath is cropped on all four edges.

The color image is then stretched to adjust contrast. Each celestial object is different and requires different stretch parameters. A table of many stretch types, low values and high values is established. It is keyed by the object type or individual name, and by camera identifier. This allows the proper parameters to be used for each situation.

The Java code for the table of stretch types follows:

```
static final Stretch[ ] stretches =
{
 // galaxies and comets
 new Stretch("Galaxy",FIVE_DEGREE,maxIm.ScreenStretchType.mxMediumStretch,1,1,1,1.1),
   new Stretch("Galaxy",null,maxIm.ScreenStretchType.mxMediumStretch,1,1,0.9,1.1),
   new Stretch("M51",PLANET,maxIm.ScreenStretchType.mxLowStretch,0.6,1,0.6,1),
   new Stretch("M33",DEEP_SKY,maxIm.ScreenStretchType.mxMediumStretch,0.7,1,0.6,1.1),
   new Stretch("M110",DEEP_SKY,maxIm.ScreenStretchType.mxMediumStretch,1.35,0.4,1.28,0.55),
   new Stretch("NGC 891",PLANET,maxIm.ScreenStretchType.mxMediumStretch,0.9,0.8,1.2,0.4),
   new Stretch("NGC 891",DEEP_SKY,maxIm.ScreenStretchType.mxMediumStretch,1.1,0.6,1.3,0.4),
   new Stretch("M31",PLANET,maxIm.ScreenStretchType.mxLowStretch,0.4,1,0.4,1),
   new Stretch("M31",DEEP_SKY,maxIm.ScreenStretchType.mxLowStretch,0.4,1,0.3,1),
   new Stretch("M31",ONE_DEGREE,maxIm.ScreenStretchType.mxLowStretch,1.1,1,1.1,1),
   // planetary nebulae
   new Stretch("Planetary",FIVE_DEGREE,maxIm.ScreenStretchType.mxPlanetStretch,0.9,0.45,0.8,0.27),
   new Stretch("Planetary",ONE_DEGREE,maxIm.ScreenStretchType.mxPlanetStretch,0.3,1.2,0.3,1.2),
   new Stretch("Planetary",PLANET,maxIm.ScreenStretchType.mxPlanetStretch,0.3,0.8,0.3,0.8),
   new Stretch("Planetary",null,maxIm.ScreenStretchType.mxPlanetStretch,0.3,1,0.3,1),
   new Stretch("M1",DEEP_SKY,maxIm.ScreenStretchType.mxPlanetStretch,0.57,0.4,0.53,0.27),
   new Stretch("NGC 40",DEEP_SKY,maxIm.ScreenStretchType.mxPlanetStretch,0.3,1,0.2,1.23),
   new Stretch("M76",DEEP_SKY,maxIm.ScreenStretchType.mxPlanetStretch,0.7,0.4,0.3,0.4),
   new Stretch("M27",DEEP_SKY,maxIm.ScreenStretchType.mxPlanetStretch,0.4,0.3,0.33,0.3),
   new Stretch("M27",PLANET,maxIm.ScreenStretchType.mxPlanetStretch,0.2,0.9,0.2,0.9),
   new Stretch("NGC 3242",null,maxIm.ScreenStretchType.mxPlanetStretch,0.5,1,0.5,1),
   new Stretch("M97",PLANET,maxIm.ScreenStretchType.mxPlanetStretch,1.2,0.7,1.2,0.7),
   new Stretch("M97",DEEP_SKY,maxIm.ScreenStretchType.mxPlanetStretch,0.9,0.7,0.8,0.7),
   new Stretch("M97",FIVE_DEGREE,maxIm.ScreenStretchType.mxPlanetStretch,0.9,0.7,0.8,0.7),
   new Stretch("NGC 7293",null,maxIm.ScreenStretchType.mxPlanetStretch,0.6,0.9,0.6,0.6),
   // diffuse nebulae and supernova remnants
   new Stretch("Nebula",FIVE_DEGREE,maxIm.ScreenStretchType.mxHighStretch,0.9,1,1,0.85),
   new Stretch("Nebula",ONE_DEGREE,maxIm.ScreenStretchType.mxHighStretch,0.5,1,0.6,0.5),
   new Stretch("Nebula",PLANET,maxIm.ScreenStretchType.mxHighStretch,0.7,1,0.8,0.5),
   new Stretch("Nebula",null,maxIm.ScreenStretchType.mxHighStretch,1,0.9,1.1,0.45),
   new Stretch("Barnard 86",ONE_DEGREE,maxIm.ScreenStretchType.mxHighStretch,0.4,1,0.5,0.5), //dark nebula & cluster
   new Stretch("Barnard 86",PLANET,maxIm.ScreenStretchType.mxHighStretch,0.6,1,0.7,0.5),
   new Stretch("NGC 7635",DEEP_SKY,maxIm.ScreenStretchType.mxHighStretch,0.6,0.8,0.9,0.4),
   new Stretch("NGC 7635",ONE_DEGREE,maxIm.ScreenStretchType.mxHighStretch,0.6,0.8,0.7,0.5),
   new Stretch("M45",ONE_DEGREE,maxIm.ScreenStretchType.mxHighStretch,1.1,0.4,1.5,0.22), //reflection nebula
   new Stretch("IC 434",DEEP_SKY,maxIm.ScreenStretchType.mxHighStretch,1.05,1,1.15,0.7),
   new Stretch("M42",DEEP_SKY,maxIm.ScreenStretchType.mxLowStretch,1,1,0,2),
   new Stretch("NGC 6992",DEEP_SKY,maxIm.ScreenStretchType.mxHighStretch,1,1,0.8,1.2),
   new Stretch("NGC
```

-continued

```
6992",FIVE_DEGREE,maxIm.ScreenStretchType.mxHighStretch,0.9,1,0.9,0.85),
   new Stretch("NGC
7023",PLANET,maxIm.ScreenStretchType.mxHighStretch,2.2,1,3,0.9), //reflection
nebula
   new Stretch("M17",PLANET,maxIm.ScreenStretchType.mxLowStretch,2.5,1,1.1,1.5),
   new Stretch("IC
5146",PLANET,maxIm.ScreenStretchType.mxHighStretch,1.5,0.33,2.2,0.22),
   new Stretch("IC
4628",ONE_DEGREE,maxIm.ScreenStretchType.mxHighStretch,1,1,1,0.8),
   new Stretch("vdB
142",DEEP_SKY,maxIm.ScreenStretchType.mxHighStretch,1.5,0.3,1.7,0.3),
   new Stretch("vdB
142",PLANET,maxIm.ScreenStretchType.mxHighStretch,1.5,0.3,1.7,0.3),
   new Stretch("M16",null,maxIm.ScreenStretchType.mxHighStretch,1.2,0.5,1.1,0.6),
   new Stretch("IC
5146",ONE_DEGREE,maxIm.ScreenStretchType.mxHighStretch,1.2,0.65,1.2,0.22),
//emission & dark nebulae
   new Stretch("IC 5146",null,maxIm.ScreenStretchType.mxHighStretch,1.4,0.7,1.5,0.3),
   new Stretch("NGC
7000",FIVE_DEGREE,maxIm.ScreenStretchType.mxHighStretch,1.04,0.7,1.05,0.6),
   new Stretch("NGC
7000",ONE_DEGREE,maxIm.ScreenStretchType.mxHighStretch,0.9,0.5,1.1,0.3),
   new Stretch("NGC
7000",null,maxIm.ScreenStretchType.mxHighStretch,1.4,0.8,1.5,0.3),
   new Stretch("NGC
6888",DEEP_SKY,maxIm.ScreenStretchType.mxHighStretch,2.4,0.3,4,0.3)
};
```

The low/high parameters are held as two pairs, one for RGB processing and the other for LRGB (discussed below).

If the object type is a star cluster or is unknown, the generic histogram stretch is used as described above. This tends to show everything in the image, including noise.

Then image is then color-smoothed. This step retains all details in the image but blends together color from neighboring pixels, creating a less grainy look. Thusly the first color (RGB) is delivered about halfway through the mission.

The remainder of the mission is used to gather 60-second exposures with the clear (Luminance) filter. The clear exposures are aligned, stacked, and combined with the RGB channel using an LRGB combine method. Adding this Luminance data further increase the signal to noise ratio and increases the smoothness of the image detail. Because LRGB tends to wash out the colors, an additional step is the increase of color saturation in the image to compensate.

The Moon has a 29.5-day cycle. When a near-full Moon is up, it significantly lights the entire sky. This creates an unavoidable challenge for imaging deep sky objects in color. The most affected objects are galaxies, diffuse nebula, and comets. The subject invention is able to successfully process deep sky images even during a full Moon. It is possible to use narrowband nebula filters (e.g. H-alpha) to image with moonlight or LP, but longer exposures are required.

G. All-Sky Image Processing

An all-sky image is produced approximately every three minutes between dusk and dawn.

The all-sky image processing is used to process the images from the all-sky camera. Similar processing may be used whether the image is monochrome or color. All-sky images are calibrated using only a scaled dark frame. A circular mask is used to clean up optical reflections outside of the useful field of view.

Because the sky conditions vary hugely with twilight/moonlight and full darkness, all-sky image processing uses custom automatic gain control (AGC). The AGC adjusts the exposure durations and selects the processing histogram based on the brightness of the raw image. AGC identifies the brightest values in the image (hopefully stars) by calculating the 99-percentile brightness. One of four histograms is applied depending on the brightness level. Each histogram was empirically and manually derived (see diagram). This normalizes the image appropriately for the conditions. The image is then sharpened slightly, copyrighted and delivered.

Initially the all-sky loop uses a 10-second exposure. Then the 99-percentile brightness is checked to make sure it is bright enough (i.e. the exposure was long enough) to have a good signal to noise ratio. If not, the image is suppressed. The AGC calculates the next exposure duration to obtain the target brightness level. The specific formula (in Java) for adjustment of the duration is:

```
mean = getMeanBrightness(image);
saturation = mean / targetBrightness;
saturation = Math.pow(saturation,1.3);
duration /= saturation;
```

4. Process Flow Diagrams

A. MissionDriver

Figure 2:
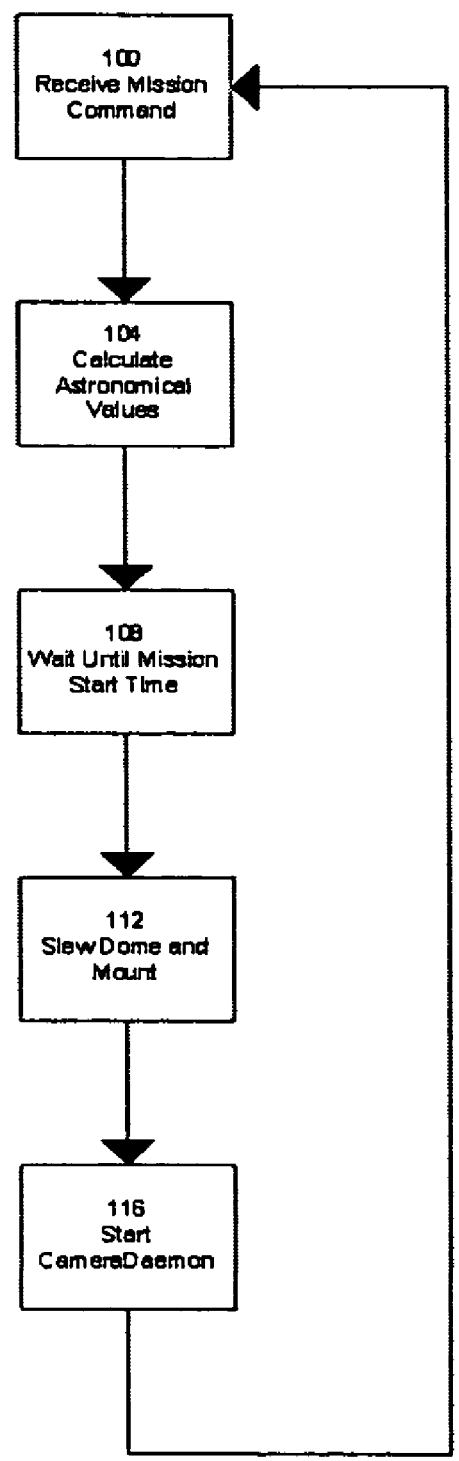
FIG. 2 is a process flow chart of the MissionDriver software program.

The process of starting a mission is shown in FIG. 2. The process is initiated when the MissionDriver receives a mission command (block 100). The program calculates required astronomical values such as right ascension and declination (block 104). The mission command specifies the start time of the mission, and the program waits until that time (block 108). The program instructs the dome and mount to move to the calculated position (block 112). The MissionDriver instructs the each telescope's CameraDaemon to begin operation.

B. CameraDaemon

Figure 3:
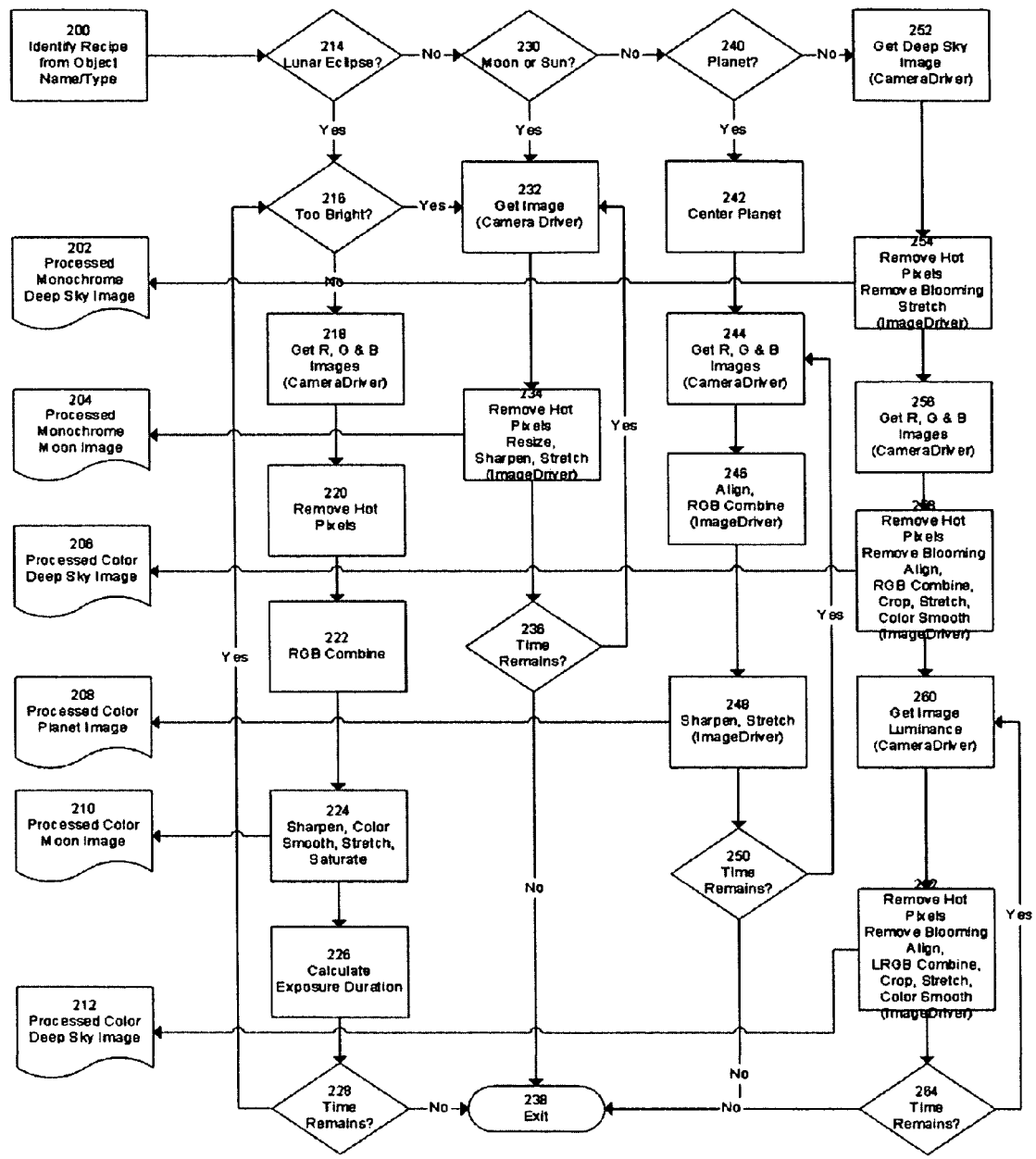
FIG. 3 is a process flow chart of the CameraDaemon software program.

The process of acquiring exposures and processing them is shown in FIG. 3. The process is initiated by an instruction to perform imaging using a specific camera, a named recipe, over a specified mission time span (block 200). Based on the recipe, the program determines whether to treat the subject celestial object as a lunar eclipse, Moon/Sun, planet, or deep sky object (blocks 214, 230, 240).

If the celestial object is a lunar eclipse, and it is too bright (the required duration is shorter than the camera's minimum, block 216), it is treated as a normal Moon. Otherwise, red, green and blue images are acquired (block 218). From each image, hot pixels are removed (block 220). An RGB Combine operation is performed on the images (block 222). The color image is then sharpened, color smoothed, stretched, and color saturated (block 224). The resulting image is delivered (block 210). Based on brightness values in the image, the next required exposure duration is calculated (block 226). If there is time remaining (block 228) in the mission time span, the process iterates back to block 216. Otherwise, the process exits (block 238).

If the celestial object is the Moon or Sun, the program gathers an image (block 232). The program removes hot pixels, resizes the image as required, sharpens it, and stretches it (block 234). The resulting monochrome image is delivered (block 204). If time remains in the mission (block 236) the process continues at block 232. Otherwise, the process exits (block 238).

If the celestial object is a planet, the program centers the planet (block 242) by looking for the brightest pixel and commanding the mount to center it. The program collects red, green and blue images (block 244). The images are aligned and RGB combined (block 246). The color image is sharpened and stretched (block 248) and delivered (block 208). If mission time remains (block 250), the process iterates back to block 244. Otherwise, the program exits (block 238).

If the celestial object is a deep sky object, the program gathers a short exposure (block 252). The program processes the image by removing hot pixels, removing any blooming, and stretching it (block 254). The monochrome image is delivered (block 202). The process continues by gathering red, green and blue exposures (block 256). The program processes the images by removing hot pixels, removing blooming, aligning them, doing an RGB combine, cropping the edges, stretching it, and color smoothing it (block 258). The color image is delivered (block 206). The process continues by gathering an exposure through a clear filter (block 260). The program removes hot pixels, removes blooming, and aligns it. Then the clear exposure(s) are LRGB combined with the earlier red, green and blue images. The edges are cropped, and the image is stretched and color smoothed (block 262). The color image is delivered (block 212). If mission time remains (block 264), the process resumes at block 260. Otherwise, the program exits (block 238).

C. CameraDriver

Figure 4:
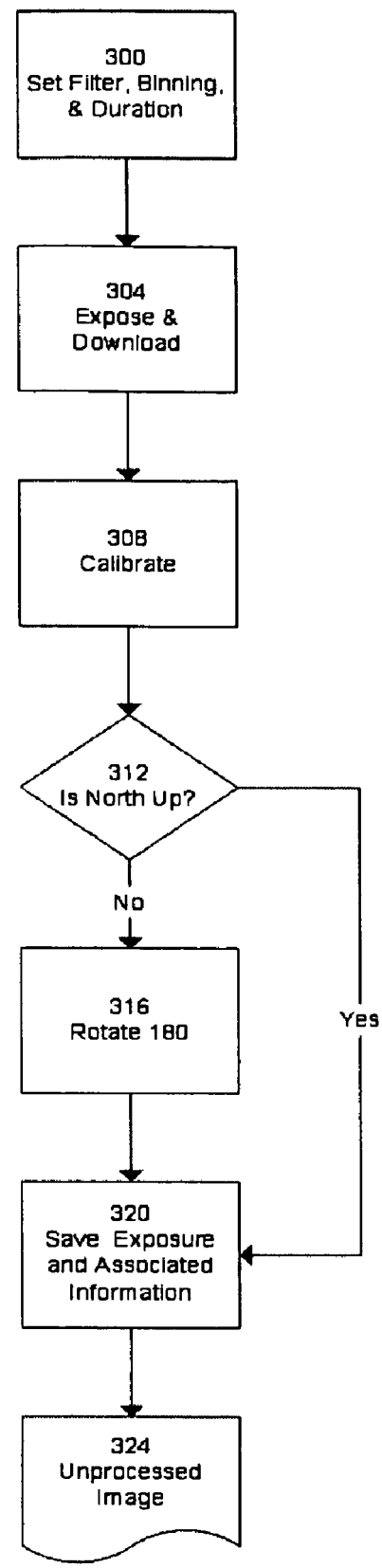
FIG. 4 is a process flow chart of the CameraDriver software program.

Referring to FIG. 4, the CameraDriver class acquires exposures for the CameraDaemon mainly by using the camera control software. Upon initiation of the process, the program sets the required filter, binning and exposure duration (block 300). When the exposure is complete, it is downloaded (block 304). The image is calibrated using bias, dark and flat frames (block 308). If the image is not already oriented north-up (block 312), the image is rotated 180 degrees so that it is north-up (block 316). Then the image is saved locally, and a variety of information is gathered for event generation (block 320). The unprocessed image is returned to the CameraDaemon for processing.

D. AllSky

Figure 5:
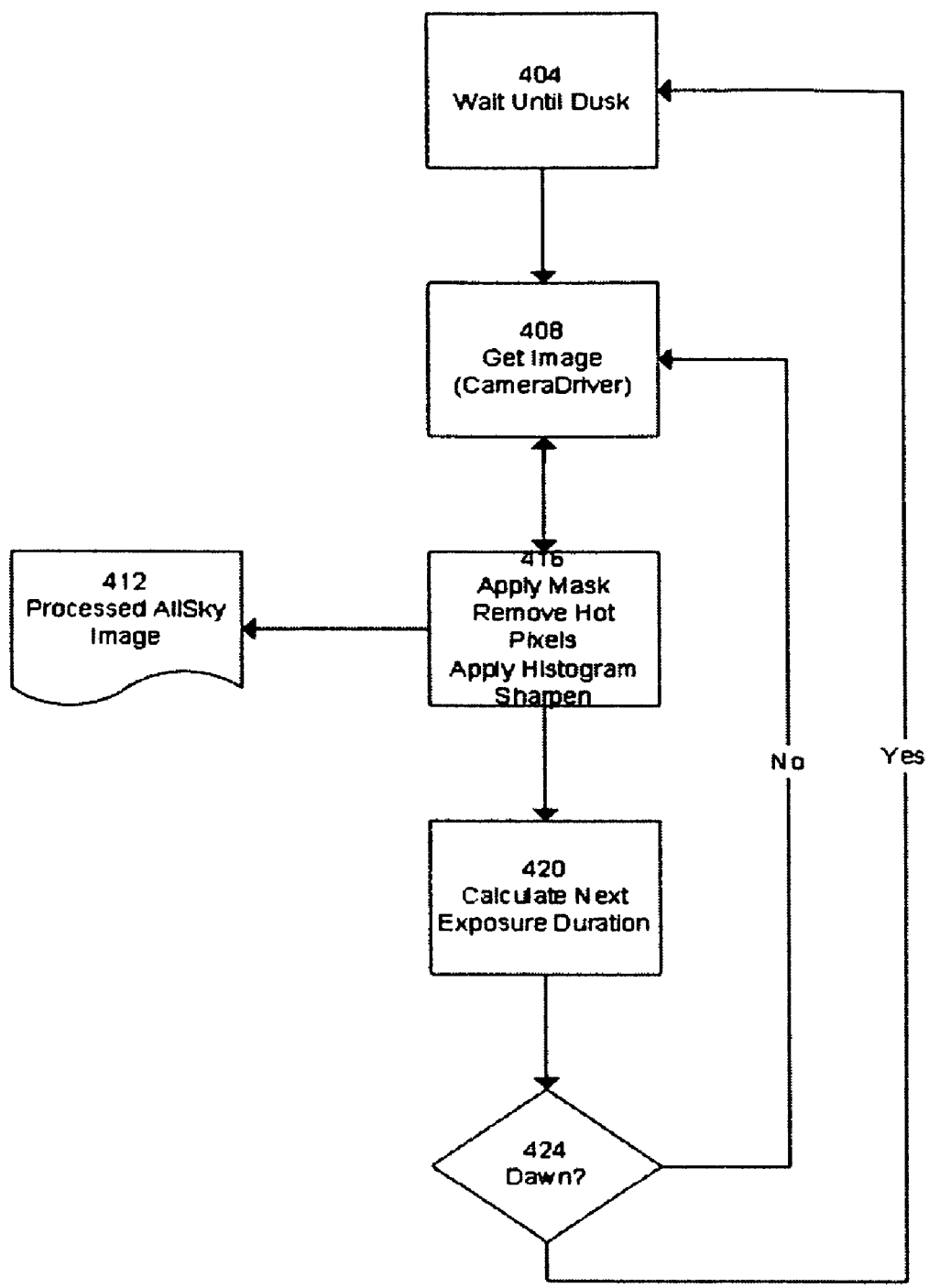
FIG. 5 is a process flow chart of the AllSkyDriver software program.

Referring to FIG. 5, the AllSkyDriver starts out by waiting until dusk (block 404). It then gathers an image (block 408). A mask is applied, hot pixels are removed, a histogram is applied, and the image is sharpened (block 416). The image is delivered (block 412). Based on brightness values in the image, the next required exposure duration is calculated (block 420). If it is not yet dawn (block 424), the process iterates back to block 408. If it is dawn, the process iterates back to block 404. The process continues indefinitely until interrupted.

E. Image Data Flow

Figure 6:
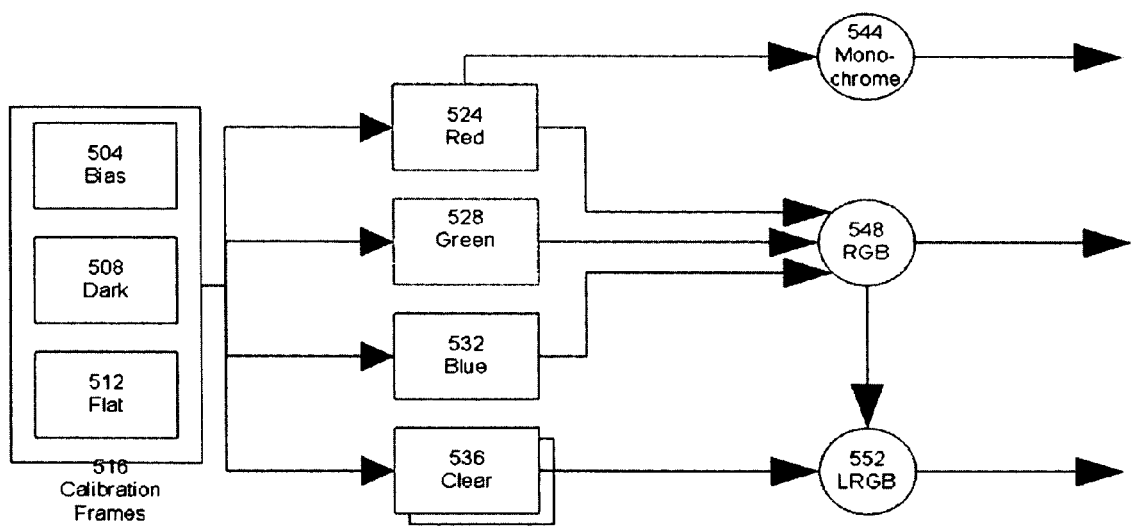
FIG. 6 is a process flow chart of the image data processing.

Referring to FIG. 6, Bias (504), Dark (508) and Flat (512) master frames are prepared in advance, and collectively referred to as Calibration Frames (516). In general at runtime every exposure is calibrated (by the CameraDriver) using these frames. Monochrome images (544) may be produced from Red exposures (524). Red, Green and Blue exposures can be RGB combined into RGB color images (548). Clear (Luminance) exposures can be LRGB combined with RGB images into color images (552) with greater detail.

F. Driver Architecture

Figure 7:
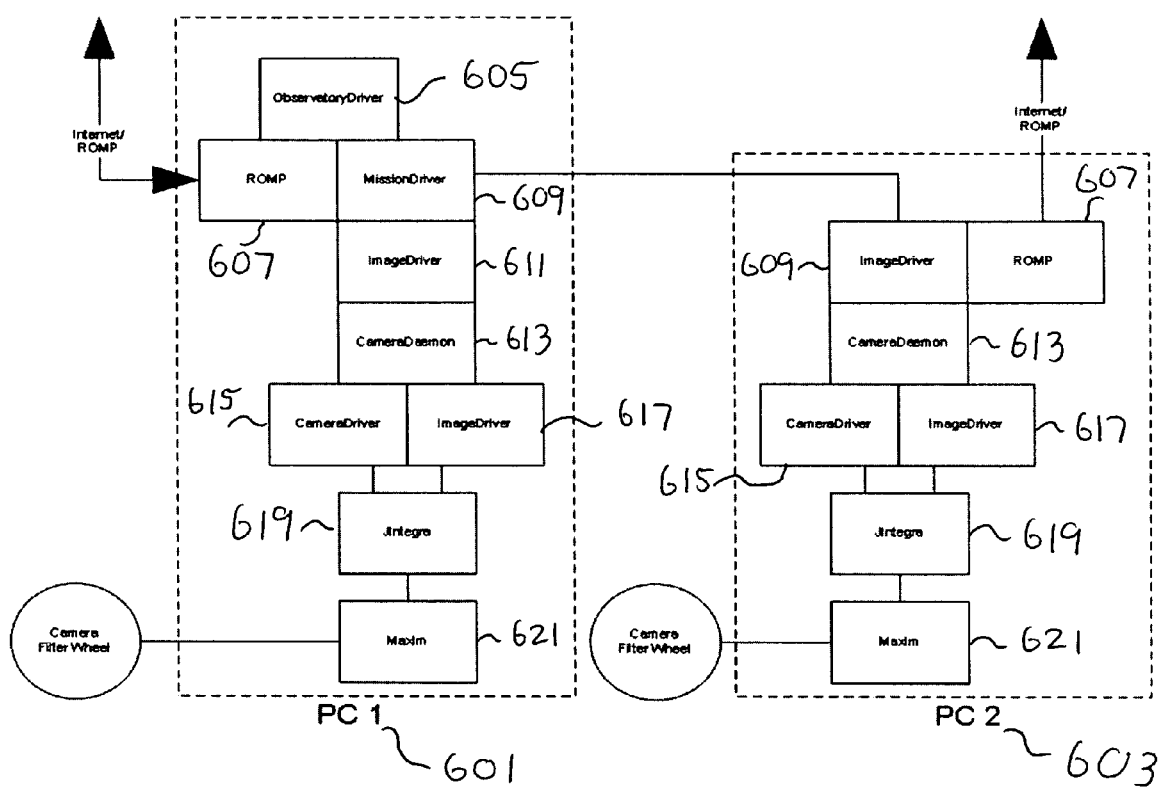
FIG. 7 is a block diagram of the overall driver architecture of the subject invention.

Next referring to FIG. 7, the overall architecture of the software drivers of the subject invention is provided, these drivers discussed in detail above. PC1 (601) is a Master computer (an Intel based P4 or better personal computer) and PC2 (603) is a similarly configured Slave computer linked to PC1 (601), with both linked to the Internet via Remote Observatory Message Protocol (ROMP, 607). The Software driver architecture of PC1 (601) is as follows: ObservatoryDriver (605); ROMP (607) and MissionDriver (609); ImageDriver (611); CameraDaemon (613); CameraDrive (615) and ImageDrive (617); JIntegra (619) and Maxim (621).

Preferably, there are two cameras in each observatory dome, but since camera software Maxim (621) can only handle one camera per personal computer, a second Slave computer, PC2 (603) is required with top level drivers residing on PC1 (601) directing driver activity on PC2 (603). The software driver architecture of PC2 (603) is as follows: MissionDriver 609 of PC1 (601) is linked to Image Drive 609 of PC2 (603) and additionally for PC2 (603) there is ROMP (607); then CameraDaemon (613); CameraDriver (615) and ImageDrive (617); then JIntegra (619) and, finally, Maxim (621).s In addition to implementation with real time image acquisition, as described above, the subject invention includes "batch mode" processing of images wherein a set of previously made images are, as a group, subjected to the techniques of the present invention as described above after the acquisition of these images.

Although the invention has been shown and described with respect to a best mode embodiment thereof, it should be understood by those skilled in the art that carious changes, omissions, and additions may be made to the form and detail of the disclosed embodiment without departing from the spirit and scope of the invention, as recited in the following claims.

We claim:

1. A method for computer image processing of telescope received camera images of a celestial object within a predetermined time period comprising:

selecting computer image processing parameters based on at least one of type of said camera, length of said predetermined time and type of said celestial object;

computer image processing said celestial images based on said computer image processing parameters to create a single image visually modified over said predetermined time period by performing processing of at least one of binning, sub frame dimension, target image size, exposure duration, color usage, and image stretching;

focusing said telescope based on at least one of the temperature and the filter of said telescope cross referenced with telescope focus data, and at least one of filter data and temperature data; and terminating said computer image processing upon expiration of said predetermined time period regardless of level of completion of said computer image processing.

2. The method of claim 1 wherein said telescope received camera images are computer image processed when said telescope recieved camera images are captured.

3. The method of claim 1 where in said telescope received camera images are computer images processed after said telescope received camera images are captured.

4. The method of claim 1 wherein said celestial object is selected from group consisting of the sun, the moon, the moon during eclipse, a planet, a star, a galaxy, a nebula, a comet, and a star cluster and said compiter processing parameters are selected based on type of said celestial object.

5. The method system of claim 1 wherein said single image visually modified over said predetermined time period is transmitted to a computer of a user over a computer network.

6. A system for computer image processing of telescope received camera images of a celestial object within a predetermined time period comprising:

a component for selecting computer image processing parameters based on at least one of type of said camera, length of said predetermined time and type of said celestial object;

component for computer image processing said celestial images based on said computer image processing parameters to create a single image visually modified over said predetermined time period by performing processing of at least one of binning, sub frame dimension, target image size, exposure duration, color usage, and image stretching;

a component for focusing said telescope based on at least one of the temperature and the filter of said telescope cross referenced with telescope focus data, and at least one of filter data and temperature data; and a component for terminating said computer image processing upon expiration of said predetermined time period regardless of level of completion of said computer image processing.

7. The system of claim 6 wherein said telescope received camera images are computer images processed when said telescope received camera images are captured.

8. The system of claim 6 where in said telescope received camera images are computer image processed after said telescope received camera images are captured.

9. The system of claim 6 wherein said celestial object is selected from the group consisting of the sun, the moon, the moon during eclipse, a planet, a star, a galaxy, a nebula, a comet, and a star cluster and said computer processing parameters are selected based on type of said celestial object.

10. The system of claim 6 wherein said single image visually modified over said predetermined time period is transmitted to a computer of a user over a computer network.

* * * * *